May 18, 1937.  H. E. YOUNG  2,080,992
INDUCTION DISK MOTOR
Filed May 11, 1935
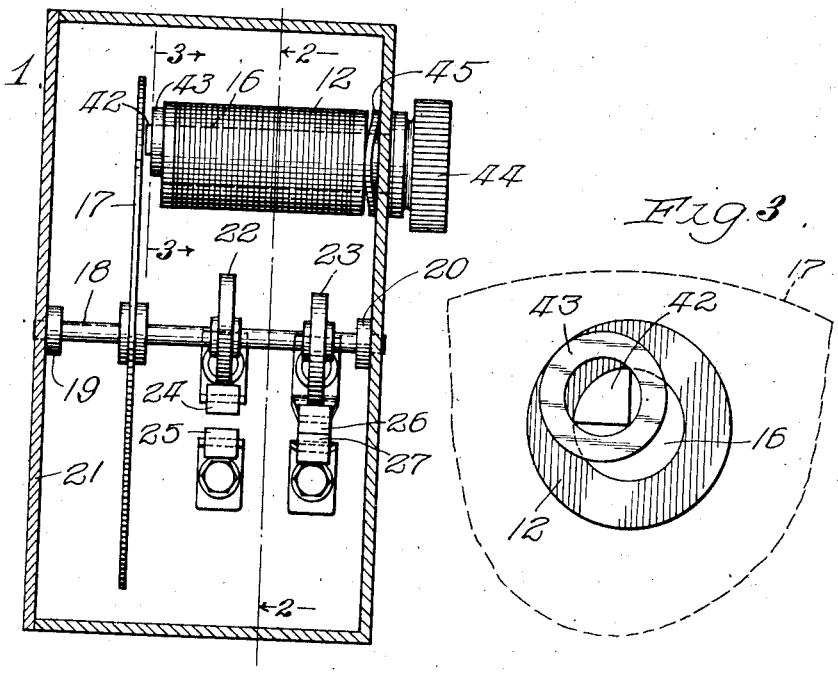
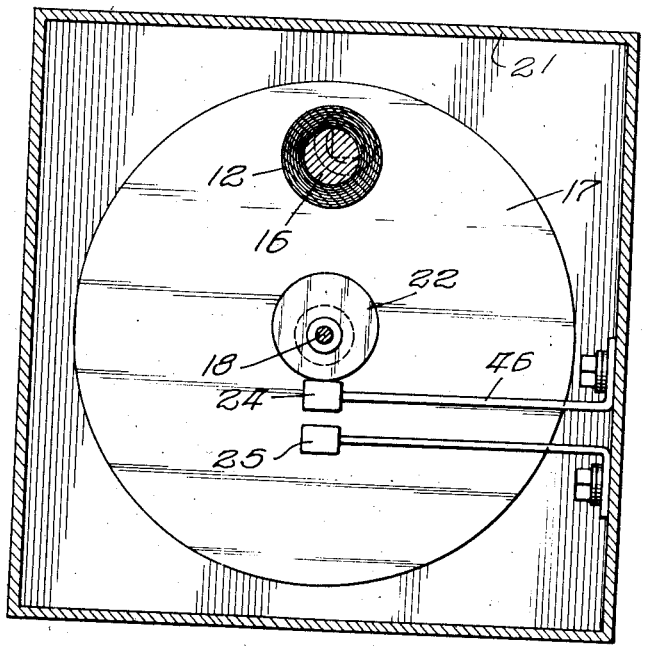
Inventor:
Hugh E. Young,
By Dynforth, Lee, Chritton, Wiles,
Attys.

Patented May 18, 1937

2,080,992

UNITED STATES PATENT OFFICE 2,080,992

INDUCTION DISK MOTOR

Hugh E. Young, Chicago, Ill.

Application May 11, 1935, Serial No. 21,045

2 Claims. (Cl. 172—278)

This invention relates to induction motors, and more particularly to an induction motor of the rotating disk type for operating contacts or other purposes.

My invention is directed to the provision of a motor of the character stated, which is of simple and inexpensive construction and the speed of which can be varied as desired, within limits. More specifically, it is an object to provide simple and inexpensive means for mounting the electro-magnet, associated with the rotating disk, in such manner as to permit of manual and direct rotation of the core member, without necessity of providing further intervening mechanisms for adjusting the shaded portion of the core. Further objects and advantages will appear from the detail description.

In the drawing:—

Figure 1 is a vertical sectional view of the motor and associated contacts, embodying my invention;

Figure 2 is a sectional view taken substantially on line 2—2 of Figure 1; and

Figure 3 is a sectional view, on an enlarged scale, taken substantially on line 3—3 of Figure 1.

In the particular embodiment of the invention illustrated the motor comprises an electro-magnet the windings or coil 12 of which is energized from a source of alternating current in a known manner. The magnet 12 has a core 16 having one face thereof adjacent a conducting disk 17, which disk may be made of aluminum, for example. This disk is non-rotatably mounted on a shaft 18, which shaft is journalled in suitable bearings, as the bearings 19 and 20 in the box or casing 21. The shaft 18 has non-rotatably mounted thereon a pair of eccentrics 22 and 23, which eccentrics are adapted to operate contacts 24 and 26, which cooperate with contacts 25 and 27, respectively, which may control suitable electrical circuits.

The particular details of the construction of the magnet and core, enabling the speed of the motor to be manually adjusted, will now be more fully described. The end of the core 16 adjacent the disk 17 has a projecting segmental portion 42, which portion is here shown as a substantially 90° wedge-shaped segment. This segment is eccentrically located with respect to the axis of the core 16, as is illustrated in Fig. 3. This projecting segment is surrounded with a shading coil or copper ring 43, which serves to effect a phase difference between the flow of the magnetic flux through the projecting segment of the core and the flux flowing through the remainder of the core. This difference in the phase of the flow of the magnetic flux sets up eddy currents in the aluminum disk 17, and thus causes the disk to rotate.

The core piece 16, for example, may be continued beyond the magnet windings 12 to the outside of the box 21, where it ends in a knurled knob or manual adjustment 44. The entire magnet is thus rotatably mounted with respect to the box and the disk 17, and a spring washer 45 is provided between the end of the magnet winding 12 and the wall of the box 21. Manual rotation or adjustment of the position of the projecting segment with respect to the axis of the core may thus be made, the spring washer serving to maintain the desired position through its frictional contact.

The direction of the force developed by the changing magnetic flux is, of course, always in line with a line between the effective center of the projecting segment 42 and the center of flux concentration through the remainder of the pole 16. This flux center would substantially coincide with the axis of the pole where the segment is relatively a small portion of the face of the pole adjacent the disk 17. When the line between the electrical center of the segment and the electrical center of the pole is perpendicular to the radius of the disk at that point the greatest turning or rotating force will be applied to the disk; while when this line is parallel to the radius no rotating effect will be exerted upon the disk. Since the direction of this line may be manually changed the component of force perpendicular to the radius, which is the component effective in rotating the disk, may be varied. Variation of this component, of course, varies the rate of speed of rotation of the disk 17. This change of speed is achieved without the use of any additional resistances, speed changing gears, or any other additional apparatus. Since the resistance of the spring member 46 which supports the contact 24, and the resistance of the similar spring member supporting the contact 26, provides a practically constant resistance to the rotation of the eccentrics 22 and 23, and hence to the rotation of the disk 17, the rate of speed of rotation of the disk 17 is substantially directly proportional to the component of force exerted perpendicular to the radius thereof.

While I have shown and described certain embodiments of my invention, it is to be understood that it is capable of many modifications.

Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In an induction disk motor, a casing, a conducting disk rotatably mounted in said casing, an electro-magnet comprising a core and a surrounding winding projecting inward from a wall of the casing, the inner end of the core being in proximity to one face of said disk and provided with an eccentric lengthwise projection of reduced cross-section, a shading coil disposed about said projection, the outer end portion of said core being rotatably mounted through said wall, and means mounting said electro-magnet on said wall and holding it against endwise movement comprising a handle secured upon the outer end of said core for rotating the latter and cooperating with said wall for preventing relative inward movement of said core.

2. In an induction disk motor, a casing, a conducting disk rotatably mounted in said casing, an electro-magnet comprising a core and a surrounding winding projecting inward from a wall of the casing, the inner end of the core being in proximity to one face of said disk and provided with an eccentric lengthwise projection of reduced cross-section, a shading coil disposed about said projection, the outer end portion of said core being rotatably mounted through said wall, a knob secured upon the outer end of said core and abutting the outer face of said wall, and a resilient member confined under compression between the outer end of said winding and the inner face of said wall.

HUGH E. YOUNG.